(12) United States Patent
Bappu et al.

(10) Patent No.: US 8,150,312 B2
(45) Date of Patent: Apr. 3, 2012

(54) PROPAGATION OF MESSAGES (75) Inventors: Benjamin Bappu, Ipswich (GB); Hui Min J Tay, Ipswich (GB); Wei C See, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 741 days.

(21) Appl. No.: 12/065,571

(22) PCT Filed: Sep. 7, 2006

(86) PCT No.: PCT/GB2006/003310
§ 371 (c)(1),
(2), (4) Date: Mar. 3, 2008

(87) PCT Pub. No.: WO2007/028995
PCT Pub. Date: Mar. 15, 2007

(65) Prior Publication Data
US 2008/0227385 A1 Sep. 18, 2008

(30) Foreign Application Priority Data

Sep. 9, 2005 (EP) .................................... 05255553
Sep. 9, 2005 (EP) .................................... 05255556

(51) Int. Cl.
*H04B 7/15* (2006.01)
(52) U.S. Cl. ...................................... 455/11.1; 455/410
(58) Field of Classification Search .................. 455/420, 455/418, 550.1, 7, 11.1, 13.1; 705/71
See application file for complete search history.

(56) References Cited

U.S. PATENT DOCUMENTS

| 7,463,898 B2 * | 12/2008 | Bayne ........................... 455/466 |
| 2003/0220835 A1 | 11/2003 | Barnes, Jr. | |
| 2005/0091173 A1 * | 4/2005 | Alve ................................ 705/71 |
| 2005/0192000 A1 * | 9/2005 | Lloyd ........................... 455/420 |
| 2005/0239495 A1 * | 10/2005 | Bayne ........................ 455/550.1 |

FOREIGN PATENT DOCUMENTS

| EP | 1 289 197 | 3/2003 |
| WO | 03/054702 | 7/2003 |
| WO | 2004/001519 | 12/2003 |
| WO | 2004/021665 | 3/2004 |
| WO | 2004/036467 | 4/2004 |

(Continued)

OTHER PUBLICATIONS

Yunos, H. M. et al., "Wireless Advertising's Challenges and Opportunities", San Jose State University, Published by the IEEE Computer Society, May 2003, pp. 30-37.

(Continued)

*Primary Examiner* — Tu X Nguyen
(74) *Attorney, Agent, or Firm* — Nixon & Vanderhye P.C.

(57) ABSTRACT

Authenticated propagation of adverts to multiple mobile recipient devices, each having both wireless and mobile telephony capability, employs message generation platforms each having a content creation engine, a metadata inserter and a signature generator, for the wireless broadcast of the generated messages. A client application on each recipient device controls viewing of the message, with authentication being provided through mobile telephony communication with a trusted authority which is in turn in secure communication with the message generation platform to hold signature information. According to an incentive policy, a device may wirelessly re-broadcast any message.

31 Claims, 3 Drawing Sheets

FOREIGN PATENT DOCUMENTS

| WO | 2004/107687 | 12/2004 |
| WO | 2007/028995 | 3/2007 |

OTHER PUBLICATIONS

ETSI TS 123 140 Technical Specification, European Telecommunications Standards Institute 2005, pp. 1-218.

ETSI TS 123 198 Technical Specification, European Telecommunications Standards Institute 2005, pp. 1-30.

Beep Science press release, "Beep Science Showcases Copyright Protected Mobile Music Service with Support for Peer to Peer Superdistribution", pp. 1-2, (undated).

* cited by examiner

PROPAGATION OF MESSAGES

This application is the U.S. national phase of International Application No. PCT/GB2006/003310, filed 7 Sep. 2006, which designated the U.S. and claims priority to GB 05255553.9, filed 9 Sep. 2005, and GB 05255556.2, filed 9 Sep. 2005, the entire contents of each of which are hereby incorporated by reference.

BACKGROUND

1. Technical Field

This invention relates to the distribution of digital media items to mobile phones and other mobile devices. In an important application of the present invention, the digital media items take the form of advertisements, but they might also take the form of music recordings, pictures, videos, other types of content or combinations of any of these.

2. Description of Related Art

Taking the example of mobile phones which use a cellular network, advertisements have been directed to mobile phones utilising multi-media messaging (MMS). An example of this is seen in international patent application WO 02/103968. However, with typical, current costings for mobile telephony, it is expensive for an advertiser to send MMS adverts to a large number of recipients. Moreover, cellular technology does not lend itself readily to the targeting of advertisements to certain groups of people or to people at a certain location. The cost to a user of forwarding an MMS message using their mobile phone means that cellular telephone networks are not a suitable platform for forms of marketing such as viral marketing which require users to forward digital adverts to other users.

The most advanced cellular phones available today are able to communicate using the existing cellular network and also using other networks—examples include WiFi networks and Bluetooth. Bluetooth enables mobile devices to communicate directly with one another over a short-range. The Wi-Fi standards (IEEE 802.11 series) allow Wi-Fi devices to operate in infrastructure mode which requires the presence of an access point, or other fixed infrastructure, or alternatively in ad-hoc mode which enables two or more Wi-Fi devices to communicate with one another directly without using fixed infrastructure. 'Ad-hoc wireless network' as used herein refers to a wireless network which does not require fixed infrastructure and thus includes, for example, Wi-Fi networks operating in ad-hoc mode, Bluetooth, Ultra-WideBand networks, and networks set-up by games consoles such as the Nintendo DS or Sony's Play Station Portable. In addition to cellular phones often being able to communicate using an ad-hoc network (often Bluetooth) in addition to a cellular network, other devices are also capable of using both a cellular network and an ad-hoc wireless network. Examples include laptops having cards providing them with 3G connectivity.

BRIEF SUMMARY

According to a first aspect of the present invention, there is provided a system for conveying digital media items to mobile recipient devices, the system comprising:
a cellular network;
an administration system in communication with said cellular network;
a plurality of mobile recipient devices capable of communication with said administration system via said cellular network and with one another via an ad-hoc wireless network; each recipient device being controlled by a digital media application to:
i) receive said digital media items from, and forward said digital media items to, one another using said ad-hoc wireless network; and
ii) send administration messages relating to the receipt and forwarding of said digital media items to said administration system using said cellular network.

In this way, examples of the present invention ingeniously combine the advantages of ad-hoc wireless networks for conveying content (e.g. high capacity at low expense) with the advantages of cellular networks for administration (e.g. security, geographical coverage) thereby taking advantage of the observation that administration messages are usually much smaller than digital media items. Administration is obviously an important function of commercial content distribution. It includes (but is not limited to) authentication of users, authors, authorization of access to networks or content, and accounting—which may involve charging or rewarding the user of the network.

In a particularly important example, administration messages include the provision of incentives to mobile device users who forward message via an ad-hoc wireless network to other mobile device users.

Advertising is a key commercial element of the wired Internet and demand is growing for appropriate advertising mechanisms in the field of mobile devices. Unwanted advertisements delivered through email or web-based technologies are regulated in many jurisdictions and are usually inefficient. They tend to be poorly targeted, lacking in geographical discrimination and are intrinsically unlikely to be viewed and appreciated by the recipient.

In one important embodiment, said administration system comprises: at least one digital media generation platform having a content creation engine; a metadata inserter adapted to insert metadata representative of at least one aspect of the digital media; a signature generator operative on the message to derive a signature; and a trusted authority in secure communication with the or each digital media generation platform to hold signature information;
and wherein said digital media application controls said media device, such that on receipt of a digital media item at the mobile device via said ad-hoc wireless network, authentication of that digital media item is sought through cellular network communication between the device and the trusted authority, and only on said authentication being provided is said digital media item presented to a user of the mobile device.

In one example, the message generation platform has access to both a wireless network (such as WiFi) and to a cellular network (supporting data communications using for example GPRS). The content creation engine enables the advertiser to create a multi-media rich video message that can be relatively large (typically one megabyte at current capabilities). The metadata inserter enables key metadata to be associated with the advertisement. Key metadata may include:
  name of message originator
  location of message originator
  time validity of message
  geographical validity of message
  category of message
  intended recipient descriptor
The metadata or some of the metadata may be relied upon at a recipient device to determine whether the message is viewed and in preferred examples of the invention the signature generator in the message generation platform operates both on the created content and on the inserted metadata to derive a signature.

In an example, a digital signature is generated using a one-way hash function. This signature is registered with a trusted authority using an appropriately secure form of communication, e.g. via a cellular network, and is preferably encrypted. The message generation platform will typically have an account with the trusted authority, providing a technical and commercial framework for the registration of signatures.

As will later be described in more detail, a mobile device receiving the message is able to determine through connection with the trusted authorizer whether the message is authentic and whether the content or metadata has been altered since registration. The metadata associated with the advertisement or other message may contain descriptors of the intended recipient of the message, such descriptors may include age and gender together with categories that are specific to particular goods and services, such as taste in food, budget in hotel accommodation and participation in various sports. These descriptors can be used at the recipient device, using policies that will be described later in more detail, to determine whether it will be appropriate for a particular message to be viewed.

The metadata may include information on the geographical validity of the message. In certain applications, geographical discrimination will be advantageous. This will particularly apply in examples of systems according to this invention that, as will be described later, provide for the multi-leg wireless propagation of messages. A geographical validity conveyed in message metadata may be employed at a recipient device in comparison with the location information available to that device. Such location information may, for example, be available through information of cell occupancy within a cellular network, through GPS or other navigational functionality, through various signal strength determination technologies as well as other direct and indirect forms of location determination.

Metadata associated with a message may determine a time validity for a message. Again, the need for information concerning time validity will be greater in multi-leg propagation systems. Time validity information may define a specific time period following a time of broadcast; may define repeated time intervals of validity (such as for example lunch time) and may of course take other forms.

In a preferred example of a system according to the present invention, the recipient is provided with incentives to view a particular message. These incentives can of course take a wide variety of forms. Incentives may relate to mobile telephony usage and take the form of credits against telephony charges. Incentives may relate to particular goods or services and may represent discount or coupons (for example, the voucher code for entry on an electronic form provided by an e-commerce web-site). Advantageously, information concerning the incentives associated with a particular message is contained in metadata. Preferably, the incentive metadata takes a standardised form permitting an application on a mobile device to test the offered incentive amount against an incentive threshold set by the recipient.

A combination of metadata, authentication by a trusted authority to ensure that the metadata is complete and accurate, and a policy run at the recipient device, provides a very powerful structure for the targeting of advertising to groups of recipients most likely willing to view the messages and to be favourably influenced by them.

The issue of geographical discrimination has already been raised. The limited range of a WiFi hotspot can be advantageous. However, there will be applications where the desired geographical range of propagation of a message is larger than the range of a particular WiFi hotspot (although still relatively small in the context of conventional geographical discriminators such as terrestrial television areas and FM radio reach.)

Accordingly, the client application on each recipient device controlling viewing of the message, advantageously operates a forward message policy adapted such that on wireless receipt of a message at the mobile device, forward incentive value metadata is tested against the policy for that device and the message forwarded by wireless re-broadcast by that device or not in accordance with said test.

Preferably, the test of message metadata against device re-broadcast policy includes device parameters such as battery life.

These incentives may take similar forms to those described above for incentives to view a message. A policy at a recipient device may include user defined predispositions for or against re-broadcast in defined circumstances. Information from message metadata stating, for example, the incentive offered for re-broadcast may therefore be considered with device parameters indicating, for example, the availability of device power for re-broadcasting, before determining whether or not the device re-broadcasts that message.

Cellular data communication with a trusted authority will advantageously assist in the management of incentives. In one example, "payment" of an incentive is conditional on receipt of a re-broadcast message by another device, on that received message being original (in the sense of not having previously been received by that device) or on that message being viewed at the recipient device. The satisfaction or not of each of these conditions may be communicated by mobile telephony to the trusted authority.

BRIEF DESCRIPTION OF DRAWINGS

The present invention will now be described by way of example with reference to the accompanying drawings in which: —

DETAILED DESCRIPTION OF EXAMPLE EMBODIMENTS

Figure 1:
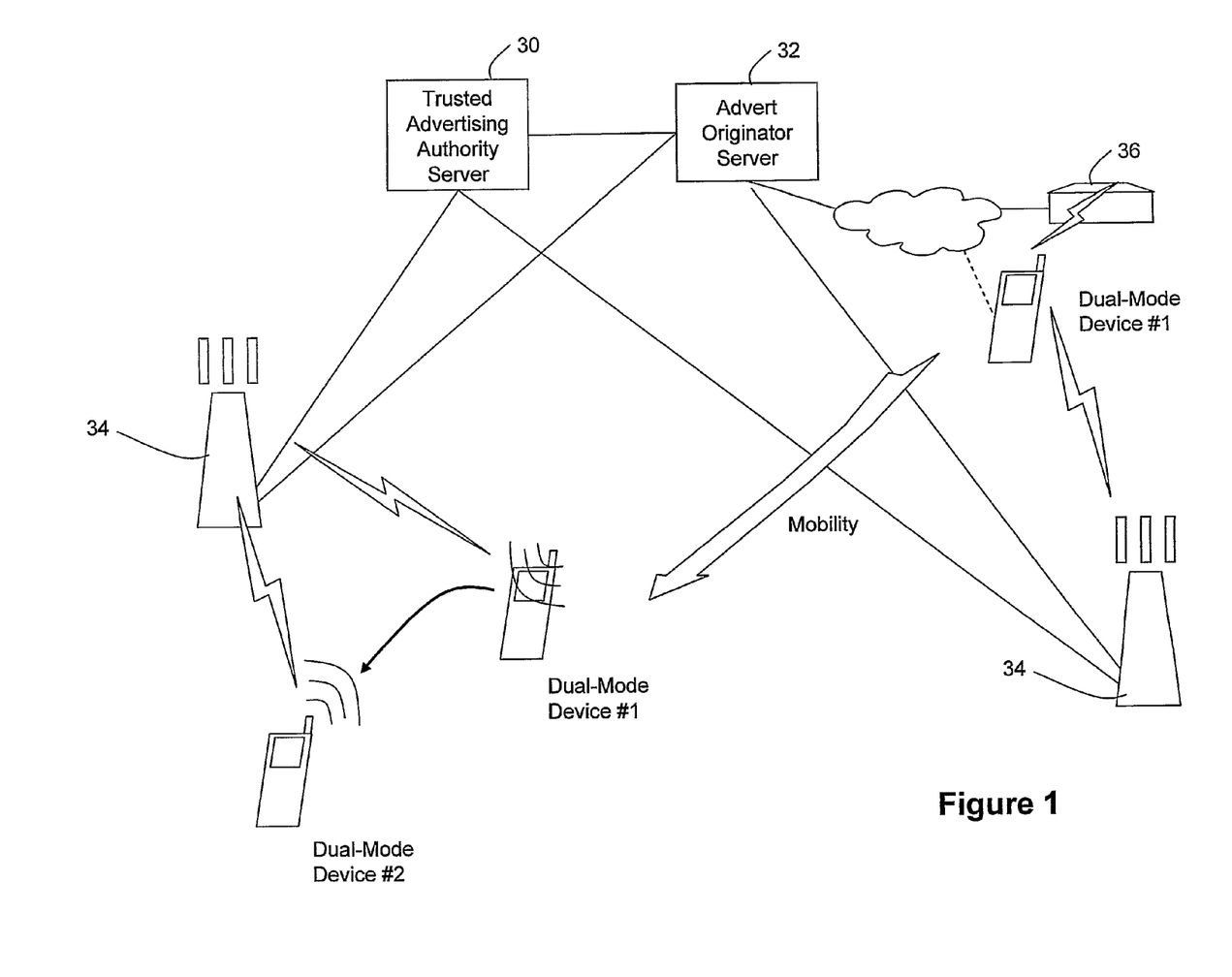
FIG. 1 system overview.

A typical system is shown in FIG. 1.

One or more servers 30 host software providing the functionality (to be described below) for the trusted advertising authority or authorities. Similarly, advert originator servers 32 host software proving a message generator platform for each advertiser. The servers 30 and 32 have Internet access as well as access to a cellular network 34 which provides some form of data communication—for example, GPRS functionality.

To enable the propagation of an advert to mobile devices, the advert originator servers 32 communicate through the Internet with various WiFi hotspots 36. It is to be understood that the advert servers could also supply the advert to a mobile device through a temporary fixed link—e.g. via USB over a wire joining the mobile device to a Personal Computer connected to the Web. Similarly, Bluetooth could be used in such circumstances.

As will be described below, the recipient mobile devices 38 are able to operate both in Wi-Fi's infrastructure and ad-hoc mode. When they are operating in accordance with 802.11's infrastructure mode they are able to receive adverts from any Wi-Fi hotspot 36 in range and when they are operating in accordance with Wi-Fi'Fi's ad-hoc mode they are able to receive adverts from, and forward adverts to other 802.11 devices in range which are also operating in 802.11's ad-hoc mode. The devices are also able to communicate using cellular network 34 via a cellular network capability. Given the geographical extent of cellular networks, such communication is generally possible when in or out of range of WiFi hotspots 36.

In one example of the present invention there is a centrally owned and trusted advertisement authority (for example based on Verisign). Each advertiser is provided with a message generation platform and would have an agreement with the advertisement authority to provide for the signature of advertisements created on that platform. The message generation platform will conveniently be a Java application and will contain a content creation engine, a metadata inserter and a signature generator.

Figure 2:
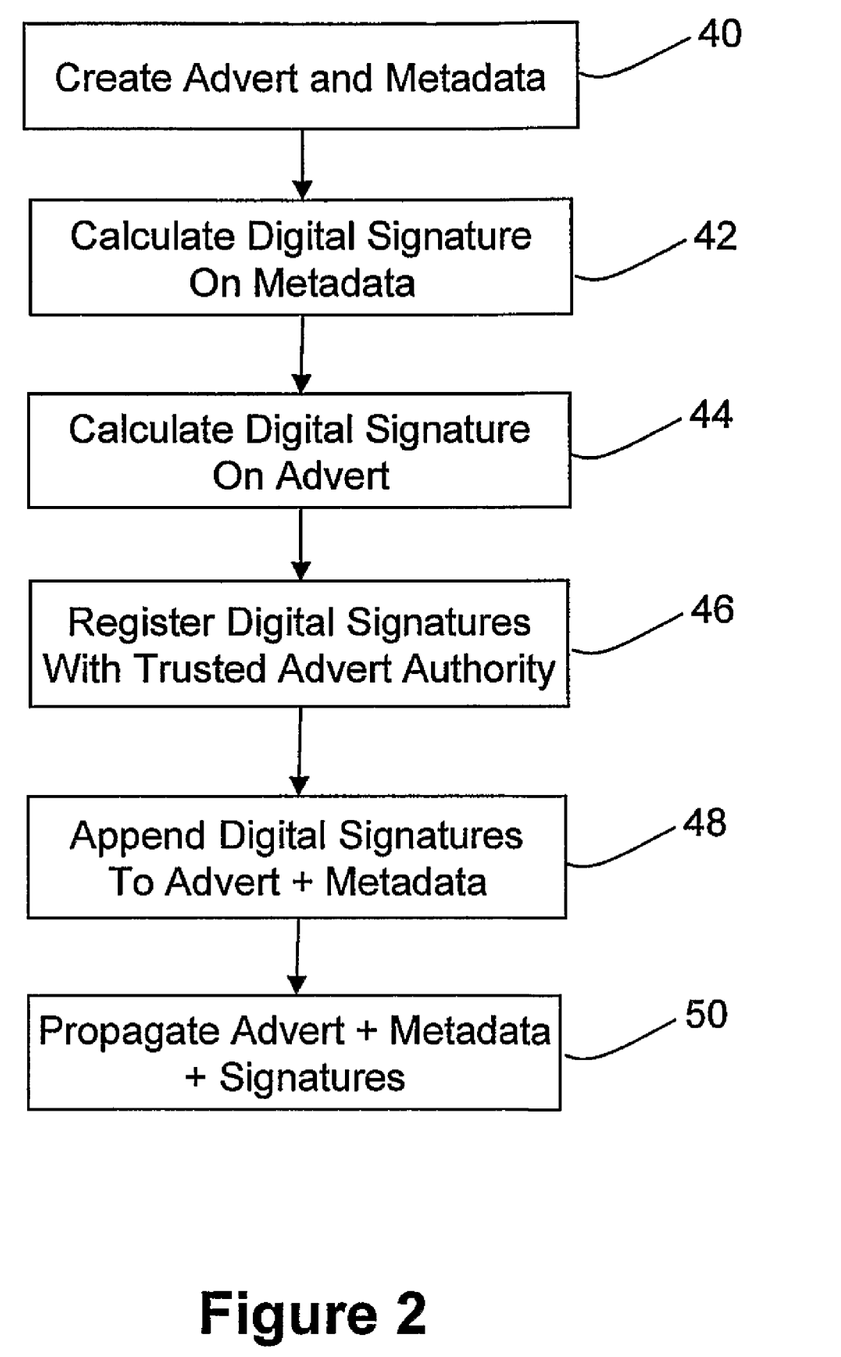
FIG. 2 is a schematic representation of steps involved in the generation of a message, in the system of FIG. 1.

The steps involved in the generation of a message are illustrated schematically in FIG. 2.

A typical advert would be a multimedia rich video message with interactive capabilities of about 1 megabyte in size. Typically, a message of this size can be exchanged in less than 1 second using 802.11a. The functionality necessary to create this content is well known and readily available and no further description is here required. Each message is provided with relevant metadata, typically in XML format. Metadata would include typical message header information such as language and encoding specification but would also include, as examples:

the name of the message originator, the location, expressed in any suitable format to include mobile telephony cell ID;

the geographical validity of the message, expressed for example in terms of a range from the location, time validity information expressed as a date and time or as a repeating interval;

a category of message descriptor, one or more intended recipient descriptors such as an age rating or gender, an interactive option flag, the name of the last known forwarder (if any), and incentive information taking in one example a numerical value for a "forward credit" and a numerical value for "view credit".

An exemplary metadata description in XML is as follows:

```
<?xml version="1.0" encoding="ISO-8859-1"?>
<!-- Advert Meta Data -->
<Advert>
   <Originator>
      <Name>BT Shop</Name>
      <Location>Cell ID</Location>
      <Range>1km</Range>
      <Date>25:12:2005</Date>
      <Time>10:10:10</Time>
   </Originator>
      <Forwarder>...
      </Forwarder>
   <Contact>
      <Address>...</Address>
   </Contact>
   <Description>
```

-continued

```
      <Type>Shopping</Type>
      <AgeRating>15</AgeRating>
      <Gender>All</Gender>
      <Size>200k</Size>
      <Hardware>Requirements...</Hardware>
      <Interactive option="Yes">
         <Duration>10s</Duration>
      </Interactive>
      <Incentives>
         <ForwardCredit>0-100</ForwardCredit>
         <ViewCredit>0-100</ViewCredit>
      </Incentives>
   </Description>
</Advert>
```

A digital signature is then created on the metadata (step 42). In one form, the digital signature is created through performing a hash function on the metadata, encrypted that message digest with the advert originator's private key to form a digital signature for the metadata. A similar process is then carried out to form (step 44) a digital signature for the advert. The two digital signatures are then registered (step 46) with the advert authority. There are of course a large variety of other techniques for signature generation that provide the same functionality of enabling a mobile device in communication with the trusted authority to authenticate a received message.

The so-formed digital signatures are then appended (step 48) to the message for propagation (step 50) via a Wi-Fi hotspot 36 or other channel as discussed above.

Today, 802.11a/b/g standards are commercially available using the unlicensed 2.4 GHz and 5 GHz bands. Two modes are supported under 802.11, the IBSS (Independent Basic Service Set) mode—also known as ad hoc mode—is especially useful for 'viral' propagation of adverts or other digital media files. In 802.11's ad-hoc mode, devices form a simple interconnecting network offering high data rates (perhaps 54 megabits per second) at typically no cost.

Figure 3:
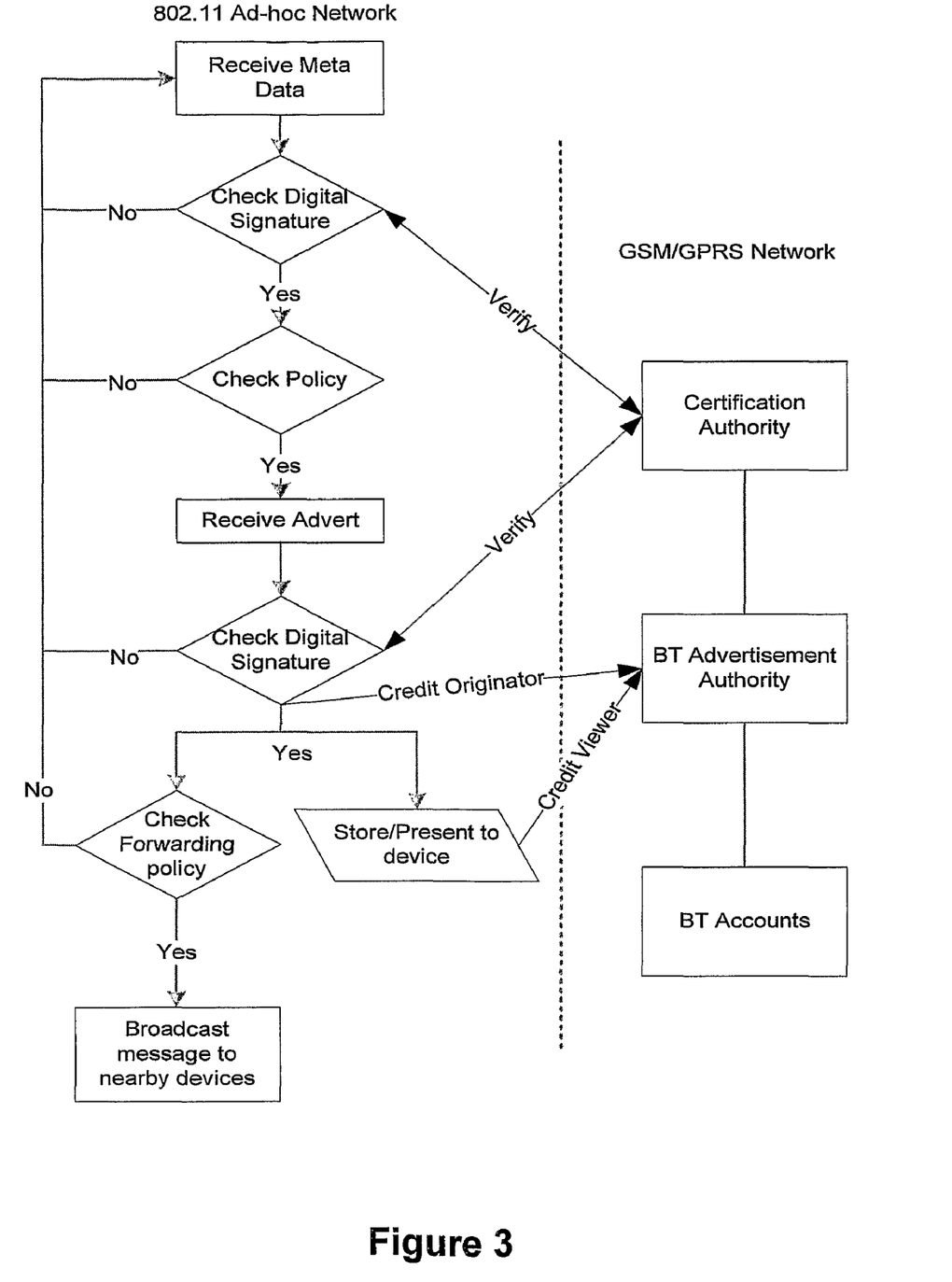
FIG. 3 is a schematic representation of steps performed at a mobile device in the same system.

Referring now to FIG. 3, which is a schematic representation of steps performed at a mobile device, a mobile phone will be provided with an advert client platform (ACP) preferably in the form of a Java application. This ACP will have access in this example to both WiFi and GPRS networks. It will provide an interface for the establishment of user defined policy and will receive information on device parameters, such as remaining battery power.

The mobile device connects either in WiFi's infrastructure mode with the message originator via a Wi-Fi hotspot (the situation in the top-right-hand corner of FIG. 1), or if it is in 802.11's ad-hoc mode with another mobile device in the ad-hoc Wi-Fi network (the situation seen in the bottom left corner of FIG. 1—a situation which might occur should the mobile device have moved location. The ACP then receives the advert metadata and accompanying signature. Using the advert originator's public-key (which could be stored in the phone, or alternatively supplied over the cellular network in a certificate from a certification authority whose public-key is stored in the phone) the mobile phone decrypts the digital signature to re-generate the message digest (it could then check through a GPRS communication with the trusted authority that the message digest matches a message digest registered there). Particularly, ACP decrypts the digital signature using the public key and compares it with the result of a locally performed hash function on the metadata. Checking that the message digest matches one stored at the trusted authority provides assurance to the mobile device that the message represented in the metadata is registered at the trusted authority. Checking the digital signature provides assurance that the metadata has been sent by the party whose public key was used to decrypt the digital signature and that the metadata has not been tampered with since origination. The ACP will then run the user policy on the metadata to determine whether the message is of interest to the recipient. This testing of the message metadata against the device policy will typically include checking of age and gender descriptions, together with a comparison of metadata descriptions of the advert originator and advert content with indications of interest entered by the user on establishment of policy. In the preferred example, this check of metadata against policy will also include comparison of a view incentive value in the metadata, with a previously determined incentive threshold. In a more sophisticated policy, this incentive threshold will vary with the category of message, with the length of message, with time of day, with available battery power, as examples.

Metadata will be checked to determine whether the message remains valid in time and valid in range. These determinations may be made directly by the client application or in concert with the trusted authority. An individual policy may be run at the trusted authority for each advertiser, enabling separate control to be exercised over the life and range of propagated messages.

If the metadata meets the requirements of the user policy, the ACP will download the message content and again verify the digital signature using GPRS over the cellular network as described above.

In the preferred form, the ACP then performs a further policy check to determine whether immediate viewing of the message is in accordance with the interruption policy of the mobile user. For example, the user may in an interruption policy determine that certain activities of the mobile device (such as audio playback or game playing) are to be interrupted by the display of a advertisement message, whilst other functions (such as a telephone call) are not to be interrupted. An interruption policy may also set an upper limit upon the number of messages to be played in any given time interval. A message which is downloaded but which is not in accord with the interruption policy may be stored and tested against the interruption policy at one or more future times.

Where a message carrying an incentive value is viewed (and a check will usually be made that the message has been viewed in its entirety) a message will typically be sent via GPRS over the cellular network to the trusted authority to update an incentive credit account held for the recipient. Alternatively or additionally, a message may be sent to the message originator. This will typically be the case where the incentive relates to the products or services of the message originator (advertiser).

Some messages may include interactive content. The appropriate flag set in the message metadata will indicate that some form of input is required from the user, other than viewing or listening. This interactive content may for example take the form of a survey, a lottery or a quiz. Prizes may be awarded for appropriate inputs; these may take the same form as the view incentives or any other appropriate form.

When ad-hoc propagation occurs (in some embodiments this may occur over a store-and-forward multi-hop wireless network rather than an ad-hoc broadcast network like the 802.11 ad-hoc mode used in this specific embodiment), the ACP will additionally run the forwarding policy of the device to determine whether a message meets the threshold for forwarding. This testing of metadata against the forwarding policy can of course be performed independently of the results of running the policies that as described above govern downloading and viewing of messages. The forwarding policy will typically be driven by the forward incentive value in the message metadata, a user predisposition to forwarding (entered on set-up of the policy) and on device parameters such as available battery power.

A message meeting the requirements of the forwarding policy will then be re-broadcast (once or a defined number of times), using the ad-hoc wireless functionality of the device—this could take place after another instance of mobility leads to the mobile device forming part of an ad-hoc wireless network in another location. Re-broadcast (forwarding) can be signalled to the trusted authority via the mobile devices cellular capability and the cellular network 34 and credit for the forward incentive be managed in the same manner as credit for the view incentive. Alternatively, credit may be conditional upon the message being received by a further mobile device and may if thought appropriate be determined by the number of such further mobile devices that receive the message. Credit may in each case be conditional upon the message being original, in the sense that the mobile device receiving the forwarded message has not already received the message in question. Credit may in appropriate circumstances also be conditional upon viewing of the forwarded message.

A device re-broadcasting a message will add metadata. Such added metadata might include the identity of the forwarder, the location (for example by cell ID) or the time of re-broadcast. This metadata enables a device to distinguish direct and forwarded messages and can also assist in testing the time and span validity of a message. This "re-broadcast" metadata (or some of it) is preferably reported via the cellular network 34 to the trusted authority. The authority may perform compliance checks on this metadata. Preferably, a new digital signature representing the supplemented metadata is generated by the authority and relayed to the forwarding device for appending to the message prior to forwarding.

A device receiving a forwarded message will test the metadata of that message against its own policies; broadly as described above for a message received directly form a WiFi hotspot. If appropriate, the message will be further re-broadcast. The receiving device will send an incentive report to the trusted authority to enable credit to be given to the forwarder. Preferably, this report will identify the receiving device, the advert and the forwarder. To protect against counterfeit incentive reports (and for general security) the ACP should reside on a restricted device platform where it cannot easily be hacked. Advantageously, the incentive report will itself be encrypted, typically with each ACP, having a unique private key. Conveniently, this can be provided through the SIM identification.

The policies run at the client application offer considerable flexibility. Often, the overriding factor in determining policy will be battery power remaining. It will then sometimes be appropriate to have sets of policy profiles based on power levels. An example of a policy profile is set out below:

```
<?xml version="1.0" encoding="ISO-8859-1"?>
<!-- Policy using profiles x,y -->
<Policy>
    <ID>X,Y<ID>
    <Message>
        <Description>...</Description>
    </Message>
    <Interrupt>
        <ViewCredit>0-100</ViewCredit>
```

-continued

```
    </Interrupt>
    <Forward>
        <ForwardCredit>0-100</ForwardCredit>
    </Forward>
</Policy>
```

Users are able through a policy set-up interface to make personal choices balancing power usage, and incentives earned.

Additionally, the trusted authority may invoke policy variations from time to time or from location to location. Such policy variations can be communicated to mobile device using the cellular network 34. In one example, devices entering a mobile telephony cell in which there are no advertising hotspots, may be instructed to power down their WiFi capability. In a more complex arrangement, a device may be advised of the number of cooperating devices within WiFi range and then take that information into account when electing whether or not to re-broadcast.

In systems where there are multiple trusted authorities, the policy at the client application may allow the user to confirm whether a "new" trusted authority is to be trusted.

Each advertiser will typically have an advertiser policy, run on behalf of the advertiser at the trusted authority. This will provide a variety of functions. For instance, when a receiving device verifies a digital signature, it may also query the advertiser policy to check whether the message is valid in time or in range. Similarly, incentive reports may be checked against an incentive credit limit set by the policy.

What has been referred to as the advert or trusted authority may comprise two or more agencies. For example (and as shown in FIG. 3), an advertisement authority established to provide services in accordance with the invention may delegate tasks—and particularly signature verification tasks—to an already established certification authority. There may also be an accounts function to which is delegated the management of credits and charges.

There may be multiple trusted authorities. A trusted authority may operate to authenticate messages from a plurality of advertisers, each unknown (in the sense of not being trusted) to the recipients. A trusted authority may in appropriate cases be an advertiser that is sufficiently well known to be trusted.

It should be understood that concepts and features described in combination in the above examples might usefully be employed in certain circumstances separately or in different combinations. Thus, the feature of providing and managing incentives for forwarding of messages may be useful separately from the feature of authenticating via mobile telephony messages received wirelessly.

It should also be understood that a wide variety of modifications can be made without departing from the scope of the invention or inventions set forth in the appended claims. Thus, whilst the example has been taken of GPRS, other forms of cellular communication (whether or not yet implemented commercially) are of course available for use in the invention. It is possible that some administration messages could be sent using SMS messaging for example. Similarly IEEE 802.11 technologies are not the only forms of ad-hoc wireless capability that can be employed. For example, the inherently shorter range of Bluetooth (whilst excluding it from many applications) may be an advantage in some specific applications of the invention. The term mobile device is to be construed to include portable, handheld and vehicle mounted devices, of which mobile phones, computers, PDA's, navigation aids and games consoles are examples.

The invention claimed is:

1. A system for conveying digital media items to mobile recipient devices, the system comprising:
   a cellular network;
   an administration system in communication with said cellular network;
   a plurality of mobile recipient devices capable of communication with said administration system via said cellular network and with one another via an ad-hoc wireless network;
   each recipient device being controlled by a digital media application to:
      i) receive said digital media items from, and forward said digital media items to, one another using said ad-hoc wireless network; and
      ii) send messages relating to incentives for receiving and forwarding of said digital media items in said ad-hoc network to said administration system using said cellular network;
   wherein said administration system comprises:
   at least one digital media generation platform having a content creation engine;
   a metadata inserter adapted to insert metadata representative of at least one aspect of the digital media;
   a signature generator operative on the message to derive a signature; and
   a trusted authority in secure communication with the or each digital media generation platform to hold signature information; and
   wherein said digital media application controls said media device, such that on receipt of a digital media item at the mobile device via said ad-hoc wireless network, authentication of that digital media item is sought through cellular network communication between the device and the trusted authority, and only on said authentication being provided is said digital media item presented to a user of the mobile device.

2. A system according to claim 1, wherein the signature generator operates on the metadata such that said authentication step serves to confirm that no tampering with the metadata has occurred since creation of the message.

3. A system according to claim 2, wherein the signature generator operates on the digital media item such that said authentication step serves to confirm that no tampering with the content has occurred since creation of the message.

4. A system according to claim 1, wherein the metadata includes at least one metadata item selected from the group consisting of: name of message originator;
   location of message originator; time validity of message; geographical validity of message;
   category of message and intended recipient descriptor.

5. A system according to claim 1, wherein the metadata includes an incentive value and wherein the mobile device is arranged in operation to compare the incentive value with a stored threshold incentive value before presenting the digital media item at the mobile device.

6. A system according to claim 1, wherein said administration system comprises an accounting system arranged in operation to account for incentives earned through viewing of a digital media item having an incentive value, said device being arranged in operation to send accounting messages to said accounting system via said cellular network.

7. A digital media generation platform adapted and arranged for use in a system according to claim 1.

8. A non-transitory computer-readable medium which stores software computer program adapted to cause a computer or other programmable device to implement a digital media generation platform according to claim 7.

9. A non-transitory computer-readable medium which stores a digital media application adapted and arranged for use in a system according to claim 1.

10. A non-transitory computer-readable medium which stores software computer program adapted to cause a computer or other programmable device to implement the steps ascribed to a trusted authority in a system according to claim 1.

11. A mobile device able to communicate via both an ad-hoc wireless network and a cellular network, the device being adapted for communication with at least one other device for the receipt of digital media items transmitted using said ad-hoc wireless network, each digital media item including content, the device having a digital media application controlling presentation or transmission of said content to a user, said application being adapted such that on receipt, presentation or forwarding of a digital media item by said device, one or more messages relating to incentives for receiving, presenting or forwarding said digital media item in the ad-hoc wireless network are sent to an administration system via said cellular network;
   wherein said mobile device is configured to seek an authentication which serves to confirm that no tampering with metadata representative of at least one aspect of the digital media item has occurred since creation of the digital media item.

12. A mobile device able to communicate via both an ad-hoc wireless network and a cellular network, the device being adapted for communication with at least one other device for the receipt of digital media items transmitted using said ad-hoc wireless network, each digital media item including content, the device having a digital media application controlling presentation or transmission of said content to a user, said application being adapted such that on receipt, presentation or forwarding of a digital media item by said device, one or more messages relating to incentives for receiving, presenting or forwarding said digital media item in the ad-hoc wireless network are sent to an administration system via said cellular network
   wherein said mobile device is configured to seek an authentication which serves to confirm that no tampering with the content has occurred since creation of the digital media item.

13. A device according to claim 11, wherein the metadata includes at least one metadata item selected from the group consisting of: name of message originator; location of message originator; time validity of message; geographical validity of message; category of message and intended recipient descriptor.

14. A device according to claim 1, wherein the metadata includes an incentive value and wherein the client application is adapted to compare the incentive value with a stored threshold incentive value before viewing of the message at the mobile device.

15. A system for the propagation of messages to multiple mobile recipient devices each having both ad-hoc wireless and cellular capability, the system comprising:
   at least one message generation platform having a content creation engine and a metadata inserter adapted to insert metadata representative of at least a forward incentive value, the message generation platform being adapted for communication with said multiple mobile recipient devices; and
   a client application on each recipient device controlling viewing of the message, said application operating a forward message policy adapted such that on receipt of a message at the mobile device, forward incentive value metadata is tested against the policy for that device and the message forwarded via an ad-hoc wireless network by that device or not in accordance with said test.

16. A system according to claim 15, wherein the test of message metadata against device forward message policy includes device parameters such as battery life.

17. A system according to claim 15, wherein satisfaction of an incentive is conditional on receipt of a message forwarded by another device, and/or on that received message having not previously been received by that device and/or on that message being viewed at the recipient device.

18. A system according to claim 17, wherein said incentive report is digitally signed using a private key unique to the device.

19. A system according to claim 15, wherein the client application is adapted prior to forwarding of a message to add metadata representative of the device or the device location.

20. A message generation platform adapted and arranged for use in a system according to claim 15.

21. A non-transitory computer-readable medium which stores a client application adapted and arranged for use in a system according to claim 15.

22. A non-transitory computer-readable medium which stores a software computer program adapted to cause a computer or other programmable device to implement a client application according to claim 21.

23. A mobile device having both ad-hoc wireless and cellular capability, the device being adapted to receive messages, each message comprising content and metadata including at least forward incentive value metadata, the device having a client application controlling viewing of messages, said application operating a forward message policy adapted such that on receipt of a message, forward incentive value metadata is tested against said policy and the message forwarded by wireless re-broadcast by that device or not in accordance with said test.

24. A device according to claim 23, wherein the test of message metadata against device forward message policy includes device parameters such as battery life.

25. A device according to claim 23, wherein management of forward incentives is provided through cellular data communication between the device and an administration system.

26. A device according to claim 25, wherein the client application is adapted prior to forwarding of a message to obtain a signature from said administration system via said cellular network and to append that signature to the forwarded message.

27. A device according to claim 25, wherein the client application is adapted on receipt of a forwarded message to send an incentive report via a cellular network to the administration system.

28. A device according to claim 27, wherein said incentive report is digitally signed using a private key unique to the device.

29. A device according to claim 23, wherein the client application is adapted prior to forwarding of a message to add metadata representative of the device or the device location.

30. A system for conveying digital media items to mobile recipient devices, the system comprising:
   a cellular network;
   an administration system in communication with said cellular network;

a plurality of mobile recipient devices capable of communication with said administration system via said cellular network and with one another via an ad-hoc wireless network;

each recipient device being controlled by a digital media application to:
  i) receive said digital media items from, and forward said digital media items to, one another using said ad-hoc wireless network; and
  ii) send administration messages relating to the receipt and forwarding of said digital media items to said administration system using said cellular network;

wherein metadata includes an incentive value and wherein the mobile device is arranged in operation to compare the incentive value with a stored threshold incentive value before presenting the digital media item at the mobile device.

31. A mobile device able to communicate via both an ad-hoc wireless network and a cellular network, the device being adapted for communication with at least one other device for the receipt of digital media items transmitted using said ad-hoc wireless network, each digital media item including content, the device having a digital media application controlling presentation or transmission of said content to a user, said application being adapted such that on receipt, presentation or forwarding of a digital media item by said device, one or more administration messages relating to said digital media item are sent to an administration system via said cellular network, wherein metadata includes an incentive value and wherein the client application is adapted to compare the incentive value with a stored threshold incentive value before viewing of the message at the mobile device.

* * * * *